Patented Jan. 25, 1944

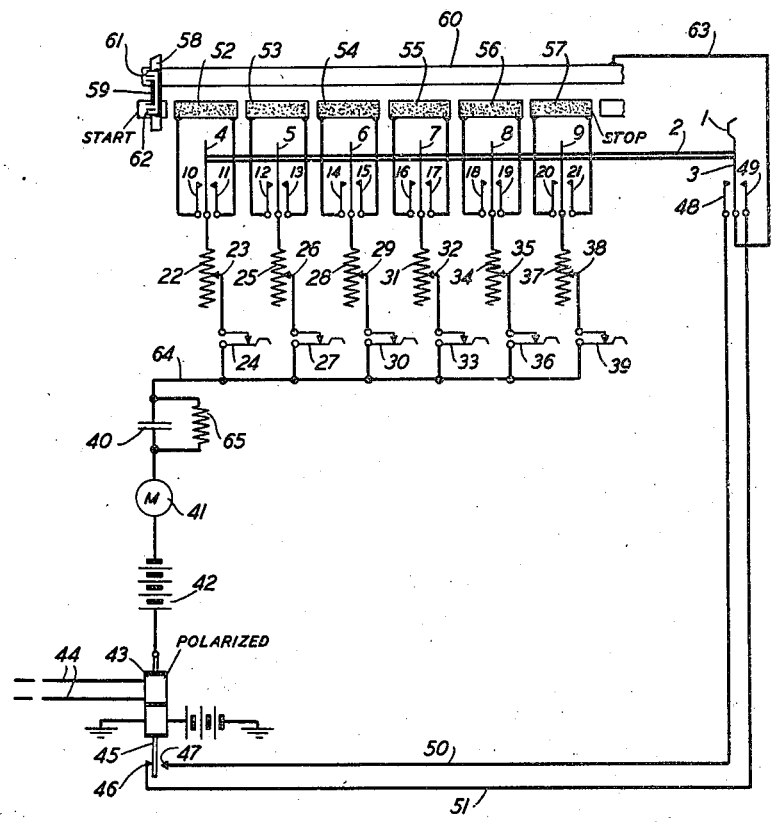

2,340,224

UNITED STATES PATENT OFFICE 2,340,224

TELEGRAPH SIGNAL DISTORTION MEASURING CIRCUIT

Wilmarth Y. Lang, Towaco, N. J., assignor to Bell Telephone Laboratories, Incorporated, New York, N. Y., a corporation of New York Application October 20, 1939, Serial No. 300,299

5 Claims. (Cl. 178—69)

This invention relates to telegraph systems and particularly to the maintenance and testing of telegraph systems.

An object of this invention is improved maintenance of telegraph systems.

A more particular object of the invention is the improvement in distortion measuring apparatus and circuits used in the maintenance of telegraph systems.

A feature of this invention is a simple and relatively inexpensive apparatus and circuit arrangement for use in measuring distortion in a telegraph circuit.

A further feature of this invention is the use of material having a much higher specific resistivity than the material which has heretofore been employed as conducting segments in the well-known rotary telegraph transmitting and receiving distributors.

Heretofore, as far as applicant is aware, copper or other low resistance material only has been used as conducting segments in transmitting distributors. Segments of relatively high resistance materials, used in conjunction with the rotating brush contact of the usual transmitting and receiving distributors, provide compact variable resistance devices which may be conveniently employed for many purposes in various circuits, particularly in telegraph circuits. In the invention herein, they are employed specifically in an arrangement for measuring distortion in a telegraph circuit to provide an effective, compact, inexpensive device for this purpose.

The invention may be more fully understood from reference to the single figure of the drawing which shows schematically the distortion measuring circuit of this invention, including the high resistance segments of the start-stop, rotary transmitting distributor which are indicated schematically as developed, instead of as arranged physically on the well-known rotary distributor.

The detailed description of the operation of the arrangement shown on the drawing is as follows.

The upper winding of polar relay 43 is connected by conductors 44 to a source of telegraph signals, the amount of the distortion of which is to be determined by the distortion measuring circuit herein. The circuit of the invention as shown is arranged to be connected to a source of signals, such as Baudot signals, wherein each character is formed by a signal train comprising a uniform number of impulses each of which for perfect transmission should be of equal length and equal in length to the transmitted signals. Due to a number of factors, such as the mechanical limitations of the transmitting device, the kind of circuit, as well as the electromechanical devices in the circuit, to which the transmitter is connected, some measure of distortion, manifested in a changing of the length of the received signals from the fixed standard, is invariably introduced. The amount of this change may be determined by the present device.

The polar relay 43 is biased by means of current through its bottom winding, so that its armature 45 is operated to engage with its right-hand contact 47, while no current is being transmitted through conductors 44. In this system seven impulses are involved in the transmission and reception of each signal train, namely, a start impulse which is a no current or spacing pulse, five impulses which may be either current or no current in any combination to determine the identity of the character, and a stop or current impulse. For the start impulse the circuit through conductors 44 is opened so that no current is passed through conductors 44 and the top winding of relay 43. This causes the armature of relay 43 to be operated to engage with its right-hand or spacing contact 47. Simultaneously, a start magnet, not shown, is operated in a well-known manner to withdraw a latch, not shown, and to permit the brush arm 58 to rotate and to sweep across the face of the distributor. The mechanism which performs these functions is well known in the telegraph art and it is not, therefore, illustrated herein.

After the start impulse is received, the train of five impulses, which may be current or no current impulses in any combination, depending upon the particular letter character, are passed through the winding of relay 43. A current impulse will operate the relay armature 45 to engage its left-hand or marking contact 46. Successive current impulses will maintain the armature against contact 46. The intervals of no current will permit armature 45 to be operated under the influence of the bottom or biasing winding of relay 43 to engage its right-hand or spacing contact 47. During successive no current impulses the armature will remain against contact 47.

Brush arm 58 is equipped with two conducting brushes 61 and 62 which are interconnected through brush arm 58 by means of conductor 59.

As the brushes are rotated, brush 61 makes constant contact with solid conductor 60, which physically is a continuous annular ring of solid copper. Segments 52 to 57, inclusive, are spaced concentrically from ring 60. Brush 62 makes contact successively with segments 52 to 57, inclusive. The gaps between the solid ring 60 and segments 52 to 57, inclusive, are thus bridged by a conducting circuit.

The key 1 is manually operated and is arranged so that when it is actuated either to the left or to the right its associated armatures 3 to 9, inclusive, are operated in unison to a corresponding position by means of the insulated bar 2. This key provides a means of measuring distortion manifested either in a delayed or premature breaking of armature 45 from contacts 46 or 47 depending on the position of the key.

When the armature of key 1 is operated to the right, the circuit is in position to measure distortion on signals involving the breaking of armature 45 from contact 46, for the mark to space transition. The manner in which distortion is indicated will be described below. When armature 45 is in engagement with contact 46 for the marking or current condition, which is the position indicated in the figure, a circuit may be traced from the positive pole of battery 42, through the armature 45 and left-hand contact 46 of relay 43, conductor 51, contact 49 and armature 3 of key 1, conductor 63, solid ring 60, brush 61 and conductor 59 to brush 62 where the circuit branches. As the released arm 58 sweeps across the face of the distributor, the gap between solid ring 60 and each of high resistance segments 52 to 57, inclusive, is bridged in succession. When brush 62 is in engagement with segment 52, the circuit is extended through resistance 52, contact 11 and armature 4 of key 1, variable resistance 22, sliding contact 23, contact and armature of key 24, conductor 64, condenser 40 and resistance 65 in parallel and meter 41, to the negative pole of battery 42. Variable resistance 22 and its sliding contact 23 and the corresponding resistances in the other branches provide means for compensating for variations between the resistances of the individual high resistance segments 52 to 57. Keys 24, 27, 30, 33, 36 and 39 are manually operated and provide means for observing the distortion of selected elements.

As the brush 62 makes contact successively with segments 53 to 57, these segments and their associated local connections are substituted in the path between brush 62 and conductor 64 for the circuit heretofore traced as follows. When brush 62 is on segment 53, 54, 55, 56 or 57, the circuit extends through contact 13, 15, 17, 19 or 21, armature 5, 6, 7, 8 or 9, resistance 25, 28, 31, 34 or 37, contact 26, 29, 32, 35 or 38 and key 27, 30, 33, 36 or 39, respectively, to conductor 64.

If the manual key 1 is operated to the left, it is in position to measure distortion on signals involving the breaking of armature 45 from contact 47 for the space to mark transitions. For this condition, a circuit may be traced from the positive pole of battery 42, armature 45, contact 47, conductor 50, contact 48 and armature 3 of key 1, conductor 63, ring 60, brush 61 and conductor 59 to brush 62. When the brush 62 engages segment 52, the circuit is extended through contact 10 and armature 4 of key 1, resistance 22, sliding contact 23, key 24, conductor 64, condenser 40 and resistance 65 in parallel and meter 41 to the negative pole of battery 42.

As the brush 62 sweeps over succeeding segments 53, 54, 55, 56 or 57, successive circuits are similarly established through the corresponding left-hand contacts 12, 14, 16, 18 or 20 and armatures 5, 6, 7, 8 or 9 of key 1, variable resistances 25, 28, 31, 34 or 37, sliding contacts 26, 29, 32, 35 or 38, and keys 27, 30, 33, 36 or 39, respectively, through conductor 64 to the condenser 40 and resistance 65 in parallel, and then through the meter 41 to the negative pole of the battery 42.

If there is no distortion in the received signals, the beginning of the first element forming a character will be received when the distributor arm 58 is in such position that the brushes 61 and 62 bridge the gap between solid ring 60 and the extreme left-hand end of segment 52. The duration of the first signal element as received will be equal to the time required for the brush 62 to sweep across high resistance segment 52. The successive signal elements, if there is no distortion, will likewise begin at the instant that the arm 58, together with its brushes 61 and 62, bridges the gap between ring 60 and the extreme left-hand end of each succeeding segment. The signal elements will end at the instant that the brushes sweep off the right-hand end of each segment. If there is distortion present, however, the brushes will be displaced with respect to the position they should occupy if there were no distortion.

It is pointed out that the speed of the transmitter distributor arm 58 is constant. The length of time which it takes to sweep over all of the segments corresponds to the time required to transmit a perfect character from the distant transmitting source. Aside from the start pulse, which permits the arm 58 to start rotating, and the stop pulse which arrests the motion of arm 58 in a well-known manner, after a train of impulses corresponding to one character have been received, the movement of arm 58 is independent of the transmitting source. The position that arm 58 has reached during the reception of any element comprising a character determines the length of the portion of the high resistance segment which is in series with the condenser 40. Thus, if the first signal element received after the start pulse is a current pulse, armature 45 of relay 43 will be operated from contact 47, with which it is in engagement during the open circuit start pulse, to engage contact 46. If there is no distortion present this should occur at the instant that the left-hand end of segment 52 is bridged to solid ring 60. If there is a delay in receiving the first signal element, the bridging brushes will have swept across a portion of segment 52 before the beginning of this particular signal element is received. During this interval, armature 45 will remain in engagement with its contact 47.

If the armature of key 1 is actuated to the left at this time, the circuit through segment 52 to the condenser 40 and meter 41 will be closed. The instant that relay 43 responds to the current signal, however, its armature 45 will be operated to break from contact 47. The circuit through segment 52, heretofore traced, will be broken. When the circuit is opened by the breaking of armature 45 from contact 47, the needle of meter 41 will be deflected in proportion to the distortion of the received signal. The meter may be calibrated on one scale to read percentage distortion directly for this condition. In a similar manner a delay in the reception of the start of any other signal element which involves a transition of armature 45 from contact 47 to contact 46 may be measured.

Keys 24, 27, 30, 33, 36 and 39, as stated above, provide means for making observations of the distortion of a particular signal element. The opening of any of these keys cuts its corresponding high resistance segment out of circuit and observation may be made on any one of the elements whose corresponding key remains closed.

If observation is to be made of the distortion in signals involving the breaking of armature 45 from contact 46, key 1 is operated to its righthand position. This cuts contact 46, conductor 51 and contact 49 into circuit and cuts out contact 47, conductor 50 and contact 48. During the interval that the armature 45 remains in engagement with contact 46, current will flow through any high resistance segment with which the brush 62 is in contact and through its associated circuit, as traced above. When armature 45 breaks from contact 46, the meter needle will be deflected. The deflection will be dependent on the position which brush 62 has reached and will likewise be a measure of the distortion for this condition. A second scale may be used to read percentage distortion directly for this condition.

Ordinarily, for testing purposes, particular characters are chosen for transmission to the distortion measuring circuit, disclosed herein, which provide a known desirable signal pattern. For example, signals having two or more successive current impulses may be chosen. For two successive current impulses the armature 45 of relay 43 would remain in engagement with contact 46 while brush 62 traversed high resistance segments 52 and 53. If there were present any significant distortion, represented by lengthening of the received signal, brush 62 would have passed on to high resistance segment 54 before armature 45 broke from contact 46. With key 1 operated to the right, this lengthening of the signal would be represented by a proportional deflection of the meter needle as a result of current flowing through the key contacts and resistances associated with high resistance segment 54, namely, contact 15, armature 6, resistance 28, contact 29 and key 30.

Similarly, distortion at the beginning or end of any one of the signal elements may be determined for a marking to spacing or spacing to marking transition of armature 45 by the manipulation of key 1 to the proper position and operating keys 24, 27, 30, 33, 36 or 39, as required.

Various modifications may obviously be made in the operation of the circuit. As an illustration, it would be possible to adjust the tension of armature 45 so that it made only instantaneous engagement with contacts 46 and 47 for each transition and to manipulate key 1 so that a deflection of the meter needle was obtained on make instead of on break as described above. The resistance 65 across the condenser 40 would permit the condenser charge to leak off so that the deflection of the meter would be maintained long enough to be observed.

What is claimed is:

1. In a telegraph system, a distortion measuring device for measuring distortion in telegraph signals comprising a circuit extending in series from one pole of a battery through an armature and contact of a telegraph receiving relay, through a displaceable contact, through a segment of relatively high resistance, through a resistance and condenser in parallel and through a meter to the opposite pole of said battery.

2. In a telegraph system, a circuit for measuring variations in the lengths of received telegraph signals comprising a telegraph receiving relay operated in response to said signals and a circuit extending from a source of electrical energy, through an armature and a contact on said relay, through a rotatable contacting brush on a telegraph distributor, through a segment of relatively high resistivity and electrical energy storage means to indicating means.

3. In a telegraph system, a distortion measuring circuit comprising telegraph signal receiving means, a telegraph distributor, a conducting segment of relatively high resistance on said distributor, a displaceable contact arranged to traverse said segment on said distributor and indicating means, means for actuating said contact so that it traverses different lengths of said segment before the operation of said receiving means in response to the reception by said receiving means of telegraph signal elements of different intervals in duration and means for controlling said indicating means to indicate the differences between said intervals.

4. In a telegraph system, a device for measuring differences between telegraph signals of standard and non-standard duration comprising telegraph signal receiving means and a distortion measuring circuit controlled by said receiving means, said circuit comprising a compact resistance of high specific resistivity, a displaceable contact arranged to traverse said resistance, an indicating device and means in said circuit responsive to variations in the position of said contact on said resistance for controlling said indicating device to indicate corresponding variations in the lengths of received signals.

5. In a telegraph system, a circuit for measuring variations in the lengths of received telegraph signals from signals of standard duration comprising telegraph signal receiving means, a telegraph signal distortion measuring device controlled by said receiving means, a telegraph distributor in said device, a plurality of segments of high specific resistivity on said distributor, a displaceable contact arranged to traverse said segments successively, distortion indicating means in said device and a variable resistance connected individually to each of said segments to compensate for variations in resistance of the individual segments of high specific resistivity.

WILMARTH Y. LANG.